United States Patent [15] 3,704,008
Ziegler [45] Nov. 28, 1972

[54] VACUUM PRODUCING MEANS AND METHOD

[72] Inventor: Charles Thomas Ziegler, 14242 Victory Boulevard, Van Nuys, Calif. 91401

[22] Filed: April 13, 1970

[21] Appl. No.: 32,480

Related U.S. Application Data

[60] Division of Ser. No. 804,544, March 5, 1969, Pat. No. 3,550,610, which is a continuation-in-part of Ser. No. 698,958, Jan. 18, 1968, abandoned.

[52] U.S. Cl............................261/25, 61/1 R, 61/20, 261/78 A, 261/121 R, 261/DIG. 75, 210/170
[51] Int. Cl. .............................................B01f 3/04
[58] Field of Search...........................261/25, 76–78, 261/78 A, 120–124, DIG. 75; 210/170, 198, 199, 220, 221, 63; 61/1, 2, 19, 20

[56] References Cited

UNITED STATES PATENTS 3,365,178    1/1968    Bood...........................261/25
721,036      2/1903    Gwynne et al................261/77
1,623,369    4/1927    Till.................................61/2
3,336,016    8/1967    Schreiber................210/220 X
3,151,190    9/1964    Kapitula....................261/78 R

FOREIGN PATENTS OR APPLICATIONS 1,377,571    9/1964    France.......................210/220
942,754      11/1963   Great Britain..............210/63
96,928       12/1923   Austria.........................61/19
1,163,168    9/1958    France........................61/1 R
111,431      8/1925    Switzerland..................61/19

OTHER PUBLICATIONS

Great Britain Water Pollution Research Board, 1959 Report, pps. 94–98.

Primary Examiner—Tim R. Miles

[57] ABSTRACT

A vacuum producing method and means to be submerged and secured below the surface of a body of flowing water and comprising a casing with converging axial passage means forming a waterway, and an annular channel communicating with and supplying air to a restricted portion of said waterway.

20 Claims, 5 Drawing Figures

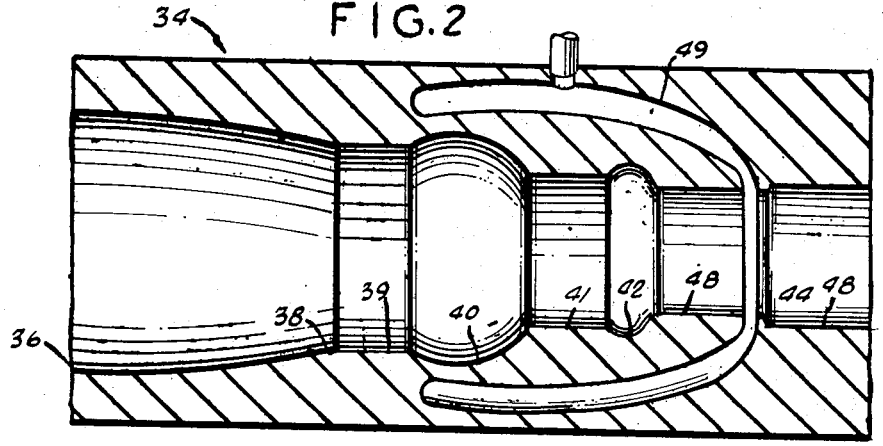
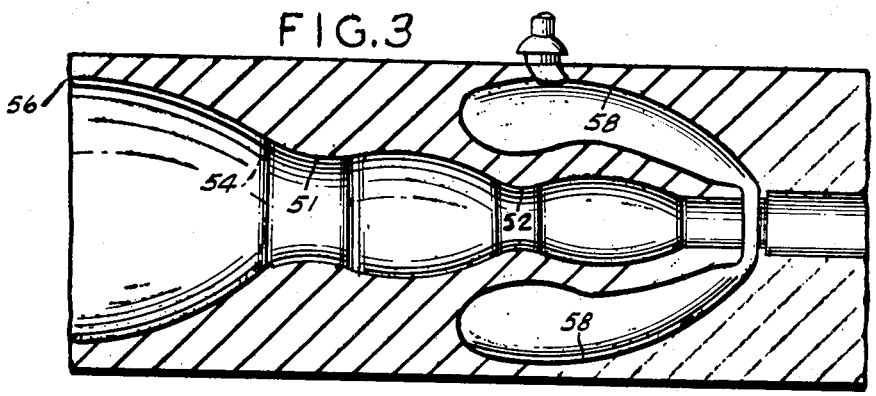
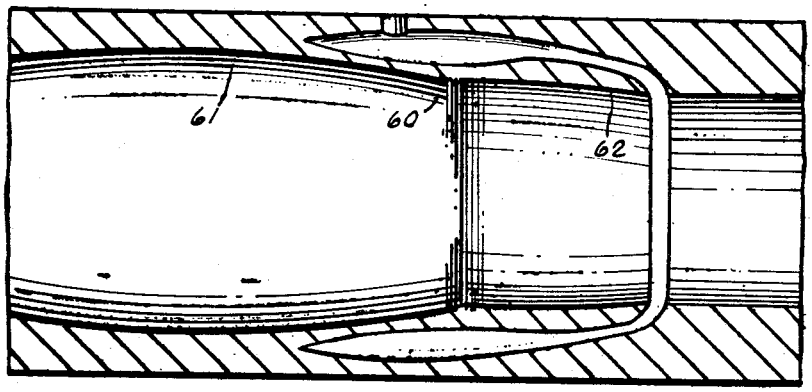

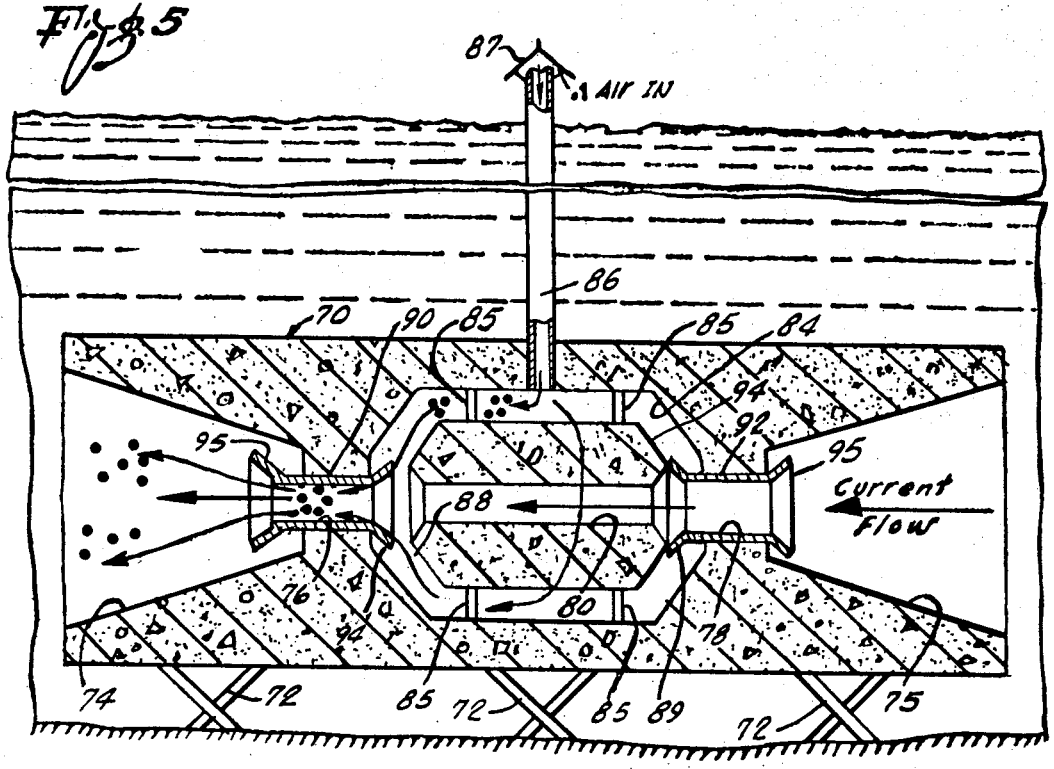

VACUUM PRODUCING MEANS AND METHOD

This application is a division of application Ser. No. 804,544, filed Mar. 5, 1969, now U. S. Pat. No. 3,550,610, which in turn is a Continuation-in-part of my application entitled "VACUUM PRODUCING MEANS," Ser. No. 698,958, filed Jan. 18, 1968, now abandoned.

This invention relates to an apparatus and method of producing a vacuum utilizing the natural flow of fluid, and relates more particularly to a tunnel structure or casing formed with a passage or waterway of decreasing diameter from end to end, the casing being immersed in a body of flowing water. This body of water may be an inland stream or may be tidal water. The velocity of flow through the casing is accelerated from the larger inlet end to a smaller discharge or nozzle end to produce a vacuum capable of drawing large quantities of air from the atmosphere into the stream for a variety of purposes such as purifying the water by incorporating oxygen into the water.

An important object of the invention is to provide an improved apparatus for the aeration of flowing bodies of water. Streams become so polluted with chemicals and sewage that aquatic life cannot be supported, due primarily to the reduced oxygen content. The waste chemicals combine readily with oxygen, however, and the apparatus of the present invention replenishes the oxygen. It is also important to note that oxygenation of most waste chemicals renders them harmless. The apparatus of the present invention can also be used in bays that are subjected to tidal variations for aerating the water flowing into the bay where lobster raising operations exist.

One embodiment of the invention includes a casing having an inlet end and a discharge end, the casing being suitably anchored in the stream by means sufficiently strong to prevent it from moving downstream from its operating position and also to resist a twisting movement which the flowing water tends to impart to it. The continuous passage or waterway may be of a special configuration that includes one or more tunnel sections or "runs" of substantially uniform diameter. If there is more than one run, each successive run is smaller than the preceding run, and between these successive runs there is an expansion chamber, each succeeding expansion chamber being smaller than the preceding one.

The inlet end is of tapered contour and is preferably formed with concavely curved walls and with a lesser diameter at its lower end which joins with the first run. The last run is connected with an exit tunnel forming a nozzle end that is of slightly larger diameter than the last run. The casing is also formed with an elongated annular vacuum-producing chamber that surrounds the passage through the casing. This annular chamber is joined at its lower end with the water passage between the last run and the nozzle end and the vacuum is produced in the annular chamber by the accelerated velocity of the water. A conduit extends from the vacuum chamber to the atmosphere above the level of the flowing water. The vacuum in this conduit may be used for a variety of purposes as previously mentioned. This first embodiment serves as means to aerate the body of flowing water and other simpler embodiments of the invention are employed for the same purpose.

Another embodiment of the invention is submerged in a stream of water that periodically reverses its direction of flow, for example tidewater. The submerged device aerates the water flowing therethrough in the alternate opposite direction and automatically adapts itself to the direction of flow.

In the drawings:

FIG. 2 is a central section taken through a modified form of the invention;

FIG. 3 shows another modified form;

FIG. 4 shows another modified form; and

FIG. 5 is an embodiment of the invention for use in a body of water that flows alternately in opposite directions, the embodiment being reversable in function to function in both directions.

Figure 1:
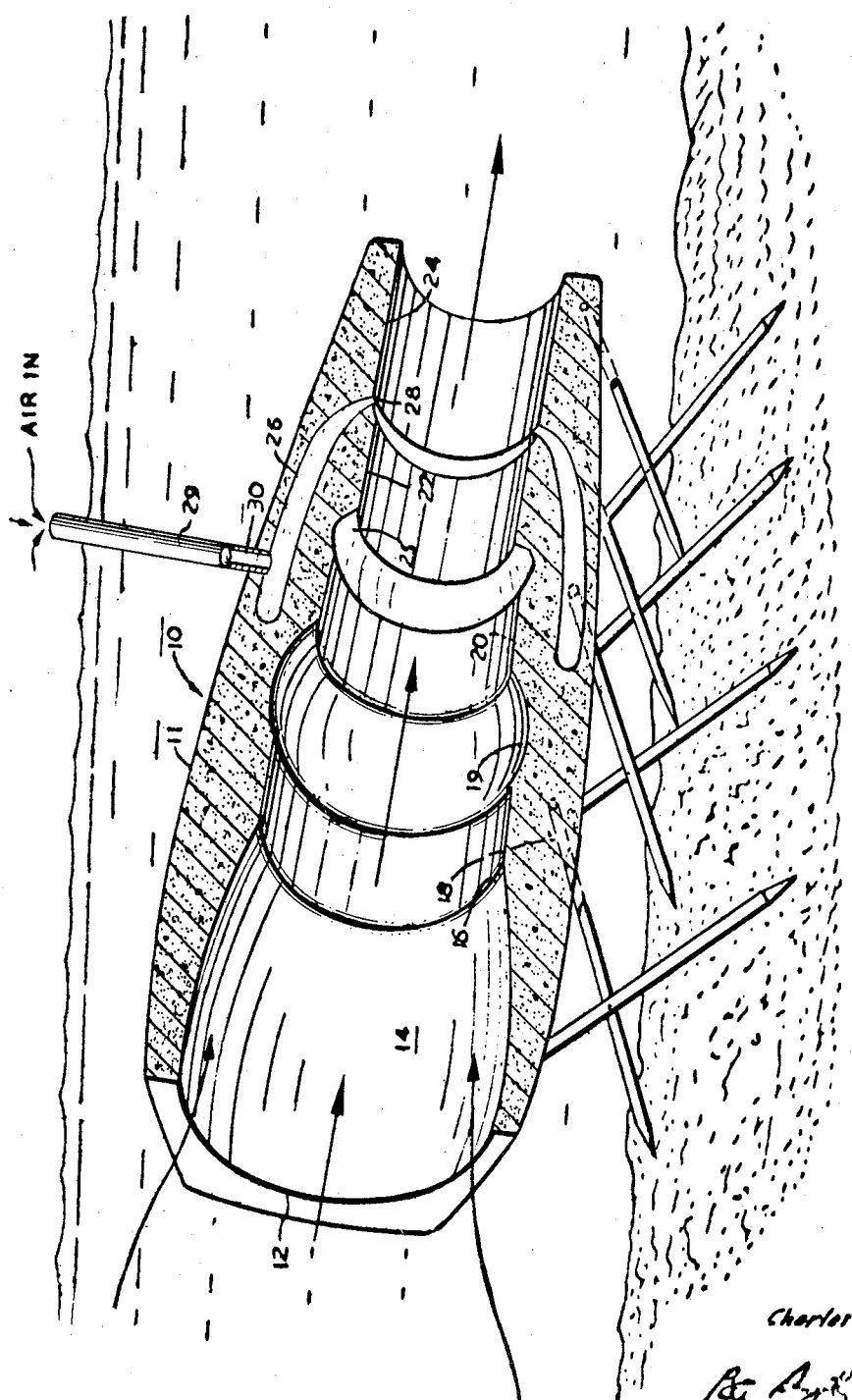
FIG. 1 is a perspective view of a longitudinal section taken through the casing of the first embodiment of the invention.

The casing 10 shown in FIG. 1, which may be molded or cast from concrete or other suitable material, has an outer cylindrical surface 11 and has a water passage 14 extending therethrough from end to end. At a point downstream from the inlet end, there is a first tunnel section or run 18 which is shown in FIG. 1 as being of substantially uniform diameter. Between the inlet end 12 and this first tunnel section 18 is an inlet section which is funnel shaped and preferably has curved walls which taper downstream. The inlet section has its smallest diameter at 16 where it joins with the first tunnel section 18 which leads to an expansion chamber 19 of larger diameter than the tunnel section and which may have a generally spherical contour.

A second run 20 adjacent the expansion chamber 19 has a lesser diameter than the first run 18 and this second run leads to a second expansion chamber 21 somewhat shorter than the first expansion chamber 19 and also formed with concavely curved walls. A third tunnel section 22 of still lesser diameter leads to an exit section or nozzle 24 of slightly greater diameter.

An annular chamber 26 surrounding the passage 14 is formed in the casing 10 and the downstream end of this annular chamber shown at 28 communicates with an annular zone between the tunnel section 22 and the nozzle 24. The annular chamber 26 preferably extends back a reasonable distance towards the inlet end of the casing and serves as a vacuum chamber, the vacuum being caused by the venturi effect of flow of the fluid into the nozzle 24. A conduit 29 extends from the vacuum chamber 26 through an opening 30 in the casing wall and into the atmosphere above the level of the body of water. The velocity of the water entering the inlet end of the casing 10 is constant and by virtue of the progressive reduction of the cross-sectional area of the passage 14 there is a rapid acceleration of the speed of flow by the time the water reaches the annular zone at the opening 28 of the vacuum chamber 26 where the flowing water enters the slightly large nozzle 24. The quantity of air drawn into the vacuum chamber 26 can be very large.

FIG. 2 shows a casing 34 with a passage therethrough, wherein the first inlet section of the passage has a gradual taper to its lower end 38 where the inlet section joins a first tunnel section 39. Section 40, 41 and 42 are similar to the corresponding sections 19, 20 and 21 of FIG. 1. The annular space 44 between a last tunnel section 46 and a final nozzle section 48 communicates with a vacuum chamber 49 that in turn communicates with the atmosphere.

The casing of FIG. 3 has runs 51 and 52 which preferably are curved in cross section rather than straight and the inner end 54 of the first inlet section 56 is substantially smaller than the entrance to the inlet section. This figure also shows a vacuum chamber 58 of greater relative volume than the vacuum chambers that are shown in FIGS. 1 and 2.

FIG. 4 shows a more basic arrangement with a single run 60 between a tapered inlet section 61 and a tapered section 62. An annular space 64 between the tapered section 62 and a final nozzle section 65 communicates with a vacuum chamber 66 which in turn communicates with the atmosphere.

It is apparent that each of the forms of the invention shown in FIGS. 1 – 4 functions with a venturi action that is highly effective for drawing air from the atmosphere for entrainment in a flowing body of water. In all of the embodiments the diameter of the water passage through the casing is reduced at a final nozzle section to approximately one-half or less of the inlet diameter. It is to be noted that in the selected embodiments of the invention the final nozzle section discharges directly into the surrounding body of water and that by preference the length of the final nozzle section is not more than approximately 20 percent of the total length of the casing. The reduction in the cross section of the passage through the casing causes relatively high acceleration of the velocity of the stream through the casing in the zone at the upstream end of the discharge nozzle. The acceleration of the stream of water results in drop of the static pressure of the water in this zone to substantially below atmospheric pressure with the consequence that a vacuum is created in the zone and in the associated annular vacuum chamber.

FIG. 5 shows an embodiment of the invention in which a casing 70 is submerged in a body of water that periodically reverses its direction of flow, for example tidewater in a tidal basin or in off shore water where the current periodically reverses. The casing 70 which may be suitably elevated from the bottom of the water by support structure 72 and the casing may be made in separable sections for the purpose of fabrication and for the purpose of access to its interior when desired.

The casing 70 forms a passage lontigudinally therethrough which includes an inwardly convergent passage section 74 at one end and a similar inwardly convergent passage section 75 at the other end, the two sections being suitably dimensioned with a suitable angle of convergence. The inwardly convergent section 74 adjoins a first neck section 76 and the convergent section 75 adjoins similar second neck section 78. In the region of the longitudinal center of the casing 70, there is a restricted central intermediate section 80 of the water passage, the restricted section being formed by a body of concrete 82.

The body of concrete 82 is positioned inside an annular chamber 84 and is suitably supported in the annular chamber by a plurality of spoke-like radial elements 85. The annular chamber 84 is a vacuum chamber and accordingly is in communication with the atmosphere through a standpipe 86 that extends above the level of the surrounding water and is equipped with a suitable conical shield 87 to prevent foreign matter from dropping into the vacuum chamber. One end of the vacuum chamber forms a first annular section 88 of the passage through the casing and the other end of the vacuum chamber forms a second annular section 89 of the passage.

A first tubular shuttle 90 is mounted in the first neck section 76 and a similar second tubular shuttle 92 is mounted in the second neck section 78, each of the two shuttles being slidingly mounted for longitudinal movement in response to impingement of flowing water thereon. The inner end of each of the two shuttles is formed with a conical flange 94 shaped and dimensioned to mate with the corresponding conical end of the concrete body 82 and the outer end of each tubular shuttle is provided with a similar conical flange 95.

Each of the two tubular shuttles is longitudinally movable between a first retracted position and a second advanced position. In FIG. 5 the first shuttle 76 is at its retracted position where the retracting movement of the shuttle is limited by abutment of the conical flange 95 of the shuttle with the inner end of the first neck section 76 of the passage. The second shuttle 78 is shown at its advanced position where it extends across the second annular section 89 of the passage in direct communication with the restricted central section 80 of the passage.

In FIG. 5 the current is flowing from the right end of the casing to the left end and the impingement of the current against the outer conical flange 95 of the second shuttle 92 has moved the second shuttle to its advanced position. The current flowing in the same direction has impinged on the inner conical flange 94 of the first shuttle 90 to retract the first shuttle. It will be noted that the cross section of the entering current is initially reduced to the cross section of the second shuttle 92 and then is stepped down by the restricted central section 80 of the passage. Consequently the stream of water through the casing reaches maximum velocity in the central section 80 and then is discharged across the first annular section 88 of the passage into the first shuttle 90. The resulting venturi effect draws air from the atmosphere through the standpipe 86 and through the vacuum chamber 84 into entrainment with the water flowing through the casing 70.

When the direction of water flow through the casing 70 is subsequently reversed, the impingement of the water against the conical flange 95 of the first shuttle 90 advances the first shuttle into engagement with the concrete body 82 and the impingement of the water against the inner conical flange 94 of the second shuttle 92 retracts the second shuttle so that the accelerated stream of water crosses the second annular section 89 of the water passage with consequent entrainment of air in the water.

My description in specific detail of the selected embodiments of the invention will suggest various changes, substitutions and other departures from my disclosure.

I claim:

1. In a device for aerating open water that periodically flows in opposite directions, for example tidewater, the combination of:

a casing submerged in the open water in longitudinal alignment with the opposite directions of flow, said casing having a longitudinal passage therethrough for opposite directions of flow therethrough in response to the opposite directions of flow if the open water, said passage being of relatively large cross section at its opposite ends and narrowing in cross section from its opposite ends to an intermediate zone for acceleration of flow through the intermediate zone with consequent reduction of the static pressure of the water in the intermediate zone to substantially below atmospheric pressure; and means placing said intermediate zone in communication with the atmosphere for air flow from the atmosphere into entrainment in the water in the intermediate zone.

2. In a device for aerating open water that periodically flows in opposite directions, for example tidewater, the combination of:

a casing submerged in the open water in longitudinal alignment with the opposite directions of flow, said casing having a longitudinal passage therethrough for opposite directions of flow therethrough in response to the opposite directions of flow of the open water, said passage being of relatively large cross section at its opposite ends and narrowing in cross section from its opposite ends to an intermediate zone for acceleration of flow through the intermediate zone with consequent reduction of the static pressure of the water in the intermediate zone to substantially below atmospheric pressure;

means placing said intermediate zone in communication with the atmosphere for air flow from the atmosphere into entrainment in the water in the intermediate zone;

said passage having a first inwardly convergent section at one end and a second inwardly convergent section at the other end, a first neck section adjacent the first convergent section and a second neck section adjacent the second convergent section, a central intermediate section of reduced cross section between the two neck sections, and a first annular section between the first neck section and the central section and a second annular section between the second neck section and the central section with said two annular sections being in communication with the atmosphere;

a first tubular shuttle slidingly mounted in the first neck section for longitudinal movement between a first position retracted from the central section and a second position extending across the first annular section in communication with the central section;

a second tubular shuttle slidingly mounted in the second neck section for longitudinal movement between a first position retracted from the central section and a second position extending across the second annular section in communication with the central section, and said two shuttles being responsive to the opposite directions of flow through the casing to cause the first shuttle to move from its first position to its second position and to cause the second shuttle to move from its second position to its first position in response to flow through the passage from the first convergent section to the second convergent section and to cause the first shuttle section to move from its second position to its first position and to cause the second shuttle to move from its first position to its second position in response to flow through the passage from the second convergent section to the first convergent section.

3. A method of aerating a relatively large stream of open water, characterized by the steps of:

submerging in the stream a casing having a longitudinal water passage therethrough with an inlet end of the casing facing upstream and a discharge end facing downstream for the creation of flow through the passage and with the passage progressively reduced in diameter from its inlet end to its discharge end for progressive increase in the velocity of flow therethrough to create a zone in the passage of subatmospheric pressure;

positioning said zone near the discharge end of said casing, and placing said zone in communication with the atmosphere to cause flow of air from the atmosphere into entrainment in the water in the zone for discharge into the stream of open water.

4. An apparatus to aerate a stream of water comprising:

a casing forming a passage longitudinally therethrough having an inlet end and a discharge end, the passage being submerged in the stream with the inlet end of the passage facing upstream to cause water to flow through the passage and to discharge into the stream, the passage being reduced in diameter from its inlet end towards its discharge end with consequent acceleration of the velocity of the water in the passage to create a zone of subatmospheric pressure in the passage;

means placing said zone in communication with the atmosphere to cause air to flow from the atmosphere into entrainment with the water in said zone;

said passage including at least one expansion chamber positioned between said inlet end and said zone;

said expansion chamber having an upstream end and a downstream end with the downstream end being smaller in cross section than the upstream end, and the inner wall of said expansion chamber being curved in longitudinal cross section.

5. An apparatus as set forth in claim 4 in which a portion of said passage adjoining the downstream end of the expansion chamber is of substantially uniform cross section.

6. An apparatus as set forth in claim 4 in which a portion of the passage adjoining the upstream end of the expansion chamber is substantially uniform in cross section.

7. An apparatus as set forth in claim 4 in which a portion of the passage adjoining the downstream end of the expansion chamber and a second portion of the passage adjoining the upstream end of the expansion chamber are of uniform cross section.

8. An apparatus to aerate a stream of water comprising:

a casing forming a passage longitudinally therethrough having an inlet end and a discharge nd, the passage being submerged in the stream with the inlet end of the passage facing upstream to cause water to flow through the passage and to discharge into the stream, the passage being reduced in diameter from its inlet end towards its discharge end with consequent acceleration of the velocity of the water in the passage to create a zone of subatmospheric pressure in the passage;

means placing said zone in communication with the atmosphere to cause air to flow from the atmosphere into entrainment with the water in said zone, and said zone positioned near the discharge end of said casing.

9. An apparatus as set forth in claim 8 in which the passage alternately decreases and increases in cross section between its inlet end and said zone.

10. An apparatus as set forth in claim 4 which includes a vacuum chamber in communication both with said zone and the atmosphere, said vacuum chamber being of annular configuration and surrounding the passage, said vacuum chamber extending upstream from said zone.

11. An apparatus as set forth in claim 8 in which the casing terminates in a discharge nozzle and said zone is at the upstream end of the discharge nozzle.

12. An apparatus as set forth in claim 11 in which the length of the discharge nozzle is not substantially more than approximately 20 percent of the total length of the casing.

13. Vacuum producing means to be submerged and secured below the surface of a body of flowing water and comprising:

a casing with an axial passage from end-to-end forming a waterway and provided with first and second tunnel sections, the latter being of lesser diameter than the first;

an exit tunnel section forming a nozzle end adjoining but being spaced from and being slightly larger than said second tunnel section and leaving an annular opening therebetween, the casing having an annular vacuum producing chamber lying between the waterway and the outer surface thereof;

an inlet to said chamber comprising a conduit leading therefrom to the area above the surface of the water, and an outlet from the chamber leading to said annular opening;

a tapered section at the inlet end of the casing with its smaller diameter downstream leading to said first tunnel section; and a larger section between the first and second tunnel sections forming an expansion chamber, whereby the velocity of the water passing downstream through the sections of decreasing diameter will increase and draw a substantial volume of air from the area above said surface into the waterway.

14. The structure recited in claim 13 wherein the expansion chamber has concavely curved walls.

15. The structure recited in claim 13 wherein the expansion chamber is generally spherical in shape.

16. The structure recited in claim 13 wherein an additional tunnel section and expansion chamber is positioned between the first expansion chamber and the second tunnel section.

17. The structure recited in claim 13 wherein another expansion chamber and tunnel section are interposed between the first tunnel section and said first mentioned expansion chamber.

18. The structure recited in claim 13 wherein the tunnel sections are of substantially uniform diameter.

19. The structure recited in claim 13 wherein the tunnel sections have a venturi shape.

20. The structure recited in claim 13 wherein the casing has means supported by the water bed for securing the casing immovable in submerged condition within the flowing body of water.

* * * * *